(12) United States Patent
Banerjee (10) Patent No.: US 11,182,229 B2
(45) Date of Patent: Nov. 23, 2021

(54) DATA PROCESSING FOR PREDICTIVE ANALYTICS

(71) Applicant: SAP SE, Walldorf (DE)

(72) Inventor: Abhinav Banerjee, Gurgaon (IN)

(73) Assignee: SAP SE, Walldorf (DE)

( * ) Notice: Subject to any disclaimer, the term of this patent is extended or adjusted under 35 U.S.C. 154(b) by 1041 days.

(21) Appl. No.: 15/381,164

(22) Filed: Dec. 16, 2016

(65) Prior Publication Data

US 2018/0174059 A1   Jun. 21, 2018

(51) Int. Cl.
*G06F 11/00*   (2006.01)
*G06Q 10/06*   (2012.01)
*G06N 5/02*   (2006.01)

(52) U.S. Cl.
CPC ............. *G06F 11/00* (2013.01); *G06N 5/025* (2013.01); *G06Q 10/0637* (2013.01)

(58) Field of Classification Search
CPC .......................... G06Q 10/0637; G06N 5/025
See application file for complete search history.

(56) References Cited

U.S. PATENT DOCUMENTS

| | | | | |
|---|---|---|---|---|
| 8,417,715 B1* | 4/2013 | Bruckhaus | ............. | G06Q 10/04 707/758 |
| 10,600,090 B2* | 3/2020 | Wright | ................ | G06Q 30/0277 |
| 2004/0186927 A1* | 9/2004 | Eryurek | ................ | G06Q 10/063 710/12 |
| 2013/0339515 A1* | 12/2013 | Radhakrishnan | ..... | H04L 41/142 709/224 |
| 2014/0062712 A1* | 3/2014 | Reiter | ...................... | G06F 40/20 340/691.6 |
| 2015/0032746 A1* | 1/2015 | Lev-Tov | ............. | G06F 16/2465 707/737 |
| 2016/0171383 A1* | 6/2016 | Narain | ................... | G06N 7/005 706/52 |
| 2017/0090866 A1* | 3/2017 | Vaughn | ..................... | G06F 7/02 |
| 2017/0155549 A1* | 6/2017 | Bouz | ..................... | H04L 41/147 |
| 2017/0262781 A1* | 9/2017 | Yang | ................ | G06Q 10/06395 |
| 2017/0316050 A1* | 11/2017 | Hill | ...................... | G06F 16/2428 |

(Continued)

OTHER PUBLICATIONS

Gayle et al. (The Marriage of Market Basket Analysis to Predictive Modeling, pub. 2000, pp. 1-6) (Year: 2000).*

(Continued)

*Primary Examiner* — George Giroux
(74) *Attorney, Agent, or Firm* — Buckley, Maschoff & Talwalkar LLC (57) ABSTRACT

To generate insights in a predictive analysis framework for support management, raw data is received as input from an in-memory database. A predictive analysis library is integrated in the predictive analysis framework. The predictive analysis framework is generated as a configurable application-programming interface (API). Predictive analysis is performed based on the raw data and the configurable data points. The predictive analysis library functions are invoked from the in-memory database to perform predictive analysis. Predictive data model is generated based on computation performed using a prediction algorithm. Predictive insights are generated based on the predictive data model. The predictive insights are displayed in a user interface associated with a device.

19 Claims, 11 Drawing Sheets

(56) References Cited

U.S. PATENT DOCUMENTS

2017/0364590 A1* 12/2017 Hill ...................... G06F 16/283

OTHER PUBLICATIONS

Pande et al. (Market basket analysis of crash data from large jurisdictions and its potential as a decision support tool, Dec. 2007, pp. 145-154) (Year: 2007).*

SAP SE or an SAP affiliate company; SAP HANA Predictive Analysis Library (PAL); SAP HANA Platform 2.0 SPS 00; Document Version: 1.0; Nov. 30, 2016; 672 pages; (http://help.sap.com/hana/sap_hana_predictive__analysis_library__pal__en.pdf).

* cited by examiner

| Incident Identifier | Year Created | Customer Name | Incident Notes |
|---|---|---|---|
| 1 | 2015 | A | 869071 |
| 1 | 2015 | A | 1291503 |
| 2 | 2015 | B | 999124 |
| 3 | 2015 | C | 752031 |
| 4 | 2015 | D | 869071 |
| 4 | 2015 | D | 1291503 |
| 4 | 2015 | D | 999124 |
| 5 | 2015 | E | 869071 |
| 5 | 2015 | E | 999124 |
| 5 | 2015 | E | 291503 |

| Sl.No | Incident | Notes |
|---|---|---|
| 1 | 1 | 869071 |
| 2 | 1 | 1291503 |
| 3 | 2 | 999124 |
| 4 | 3 | 752031 |
| 5 | 4 | 869071 |
| 6 | 4 | 1291503 |
| 7 | 4 | 999124 |
| 8 | 5 | 869071 |
| 9 | 5 | 999124 |
| 10 | 5 | 291503 |

FIG. 4B

| POSITION | SCHEMA_NAME | TYPE_NAME | PARAMETER_TYPE |
|---|---|---|---|
| 1 | PAL | PAL_APRIORI_DATA | INPUT |
| 2 | PAL | PAL_CONTROL_T | INPUT |
| 3 | PAL | PAL_APRIORI_RESUL... | OUT |
| 4 | PAL | PAL_APRIORI_PMML... | OUT |

| Prerule | Postrule | Support | Confidence | Lift |
|---|---|---|---|---|
| 869071 | 1291503 | 0.4 | 0.6667 | 1.6667 |
| 1291503 | 869071 | 0.4 | 1 | 1.6667 |
| 752031 | 999124 | 0.2 | 1 | 1.6667 |
| 752031 | 869071 | 0.2 | 1 | 1.6667 |

400D

446 → (row 1)
448 → (row 2)
450 → (row 3)
452 → (row 4)

DATA PROCESSING FOR PREDICTIVE ANALYTICS

FIELD

Illustrated embodiments generally relate to data processing, and more particularly to data processing for predictive analysis.

BACKGROUND

Enterprises providing global services and support ensure highest service levels and business continuity. Enterprise support management applications enable the enterprises to provide global services and support with highest service levels. Enterprise support management applications provide various functionalities such as incident management, information technology service management, etc. Typically, such enterprise support management applications are used as reactive application, i.e., after an incident occurs, the incident is logged in the support management application. In such a reactive approach, there is a delay involved in assigning the incident as an incident ticket to a support technician, and for the support technician to work towards a solution. It is challenging to proactively prevent such incidents before they occur.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. Various embodiments, together with their advantages, may be best understood from the following detailed description taken in conjunction with the accompanying drawings.

DETAILED DESCRIPTION

Embodiments of techniques for data processing for predictive analytics are described herein. In the following description, numerous specific details are set forth to provide a thorough understanding of the embodiments. A person of ordinary skill in the relevant art will recognize, however, that the embodiments can be practiced without one or more of the specific details, or with other methods, components, materials, etc. In some instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
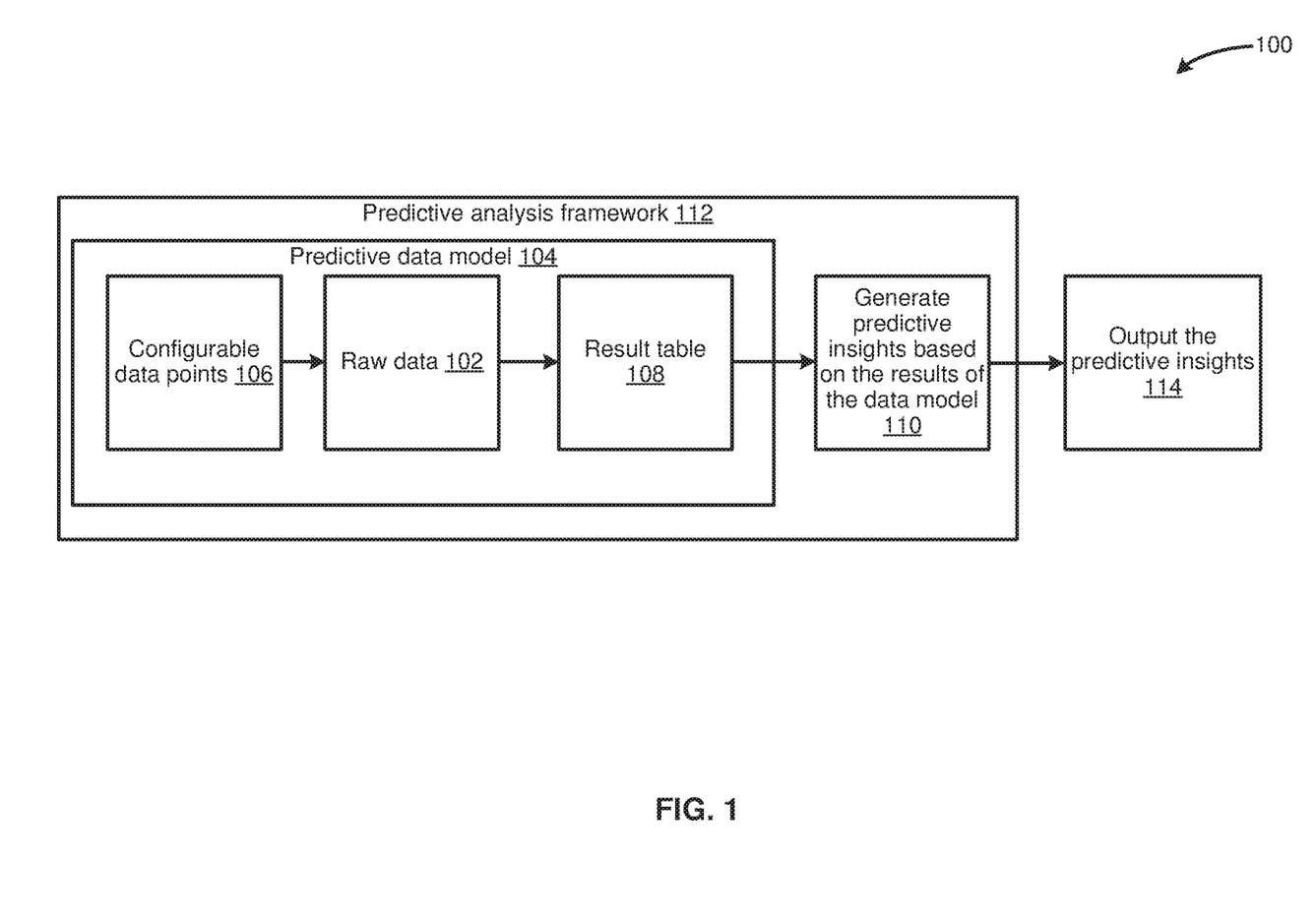
FIG. 1 is a block diagram illustrating generation of predictive insights in predictive analysis framework, according to one embodiment.

FIG. 1 is block diagram 100 illustrating generation of predictive insights in predictive analysis framework, according to one embodiment. Data for which predictive insights are to be generated are retrieved from various data repositories referred to as raw data 102. Predictive insights may help discover unknown or unexplored useful future insights based on historical or raw data. Predictive insights may be in the form of data tables, visual representations, etc. For example, in support management, incident data retrieved from support incident repository are referred to as raw data. Data points are key set of data that are instrumental to the insight being generated. For example, in the support management, incident notes are data points to be used with incident raw data. Data points are identified to be executed with the raw data 102, and to generate predictive data model 104. Data points may be configurable, such as pre-configured data points, for example, incident notes, and user defined data points, and for example, vendor or partner defined data points. Data points that are configurable are referred to as configurable data points 106. Various predictive analysis algorithms may be used on the raw data 102 along with the configurable data points 106, to generate a result table 108. Combination of raw data 102, configurable data points 106, and result tables 108 are referred to as predictive data model 104. Based on the configurable data points 106, predictive insights can be generated for internal enterprise users as well as for external partner users. Predictive data model 104 may be consumed as a service by various entities such as internal enterprise users, vendors, partner systems, mobile platforms, etc.

Based on the generated result table 108 using the predictive analysis algorithm, predictive insights are generated based on the results of the data model 110. In the predictive analysis framework 112, predictive data model 104 is generated, and predictive insights are generated based on the predictive data model 110. Predictive analysis framework 112 may be a plug-in application that may be integrated with various databases, for example as a plug-in semantic layer on an in-memory database. Predictive analysis framework 112 may be provided as a configurable application-programming interface (API), by choosing user defined data points. The generated predictive insights are output 114 in various forms, for example, alerts, notifications, graphs, etc. displayed at the user interface associated with a device. Device may be a phone, tablet, portable computer, desktop, kiosk, etc. The generated predictive insights may also be output as open data access protocol (ODATA) compliant data that can be consumed by various services or applications. ODATA protocol is an open protocol that allows creation and consumption of API's in a simple and standard way. The generated predictive insights are proactively presented to the user in the user interface. For example, in the support management, user may work on the incidents in the generated predictive insights proactively before occurrence of the incidents.

Figure 2:
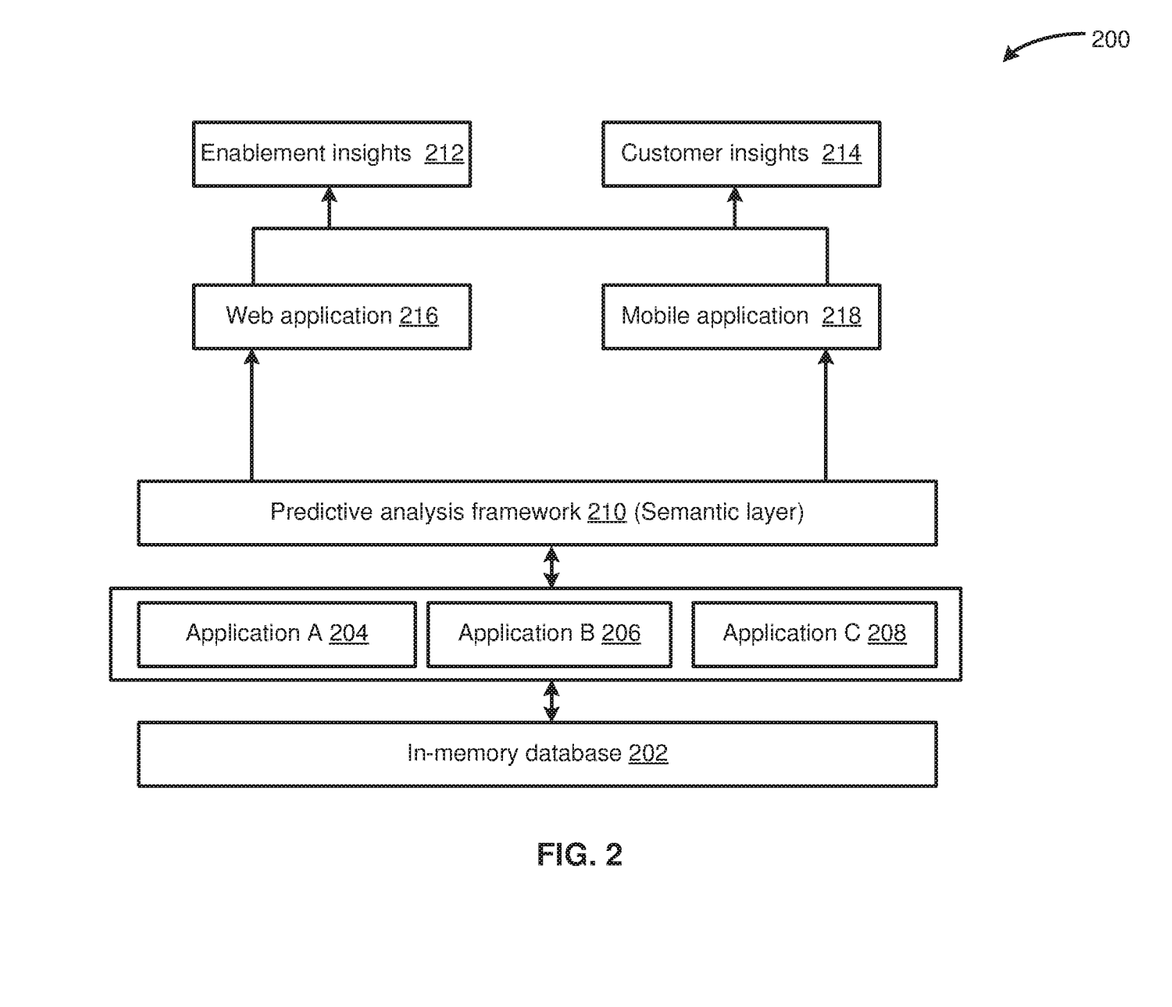
FIG. 2 is a block diagram illustrating high-level architecture of predictive analysis framework for support management in an in-memory database, according to one embodiment.

FIG. 2 is block diagram 200 illustrating high-level architecture of predictive analysis framework for support management in an in-memory database, according to one embodiment. In in-memory database 202, information required for processing are available in the main memory or volatile memory such as random access memory, therefore computation and read operations can be executed in the main memory, without involving a hard disk input/output operation. In typical in-memory database, memory organization is linear. In a linear memory organization, data may be stored in a row store or a column store. In a row store, the fields of every row in the table are stored in a row sequentially, whereas in a column store, the fields of a column are stored in a column, in contiguous memory locations. Raw data available for predictive analysis are stored in the in-memory database 202 in column store architecture.

In support management, support information may be obtained from various applications such as application A 204, application B 206, application C 208, etc. For example, application A 204 may be a customer relationship management (CRM) application that is used to manage and maintain customer related data. Application B 206 may be a notes framework that provides release documents, incident notes, bug fixes, frequently asked questions, feature releases, etc. Application C 208 may be a mobile platform for mobile applications that helps to build and deploy business and customer centric applications, and to customize existing applications. Data associated with support management applications such as application A 204, application B 206, application C 208, etc., are stored in the in-memory database 202. Data associated with support management applications may be available in various tables, and joining the relevant tables may retrieve the data. For example, table corresponding to customer related data associated with application A 204 is joined with table corresponding to incident notes associated with application B 206.

Predictive analysis framework 210 acts as a semantic layer that is an abstraction of the actual database i.e. in-memory database 202, and ensures that no actual tables in the in-memory database 202 are affected. Predictive analysis library (PAL) is integrated in the predictive analysis framework 210. PAL defined functions can be invoked from within in-memory database 202 as SQL Script® procedures to perform analytic operations. PAL supports various predictive analysis algorithms for operations such as clustering, classification, association, etc. Predictive analysis is performed on the raw data stored in the in-memory database 202. Result of the predictive analysis such as enablement insights 212, customer insights 214, etc., are displayed in web application 216 and/or mobile application 218. Predictive analysis framework 210 may be available as a configurable API to be used by customers and partner organizations.

Figure 3:
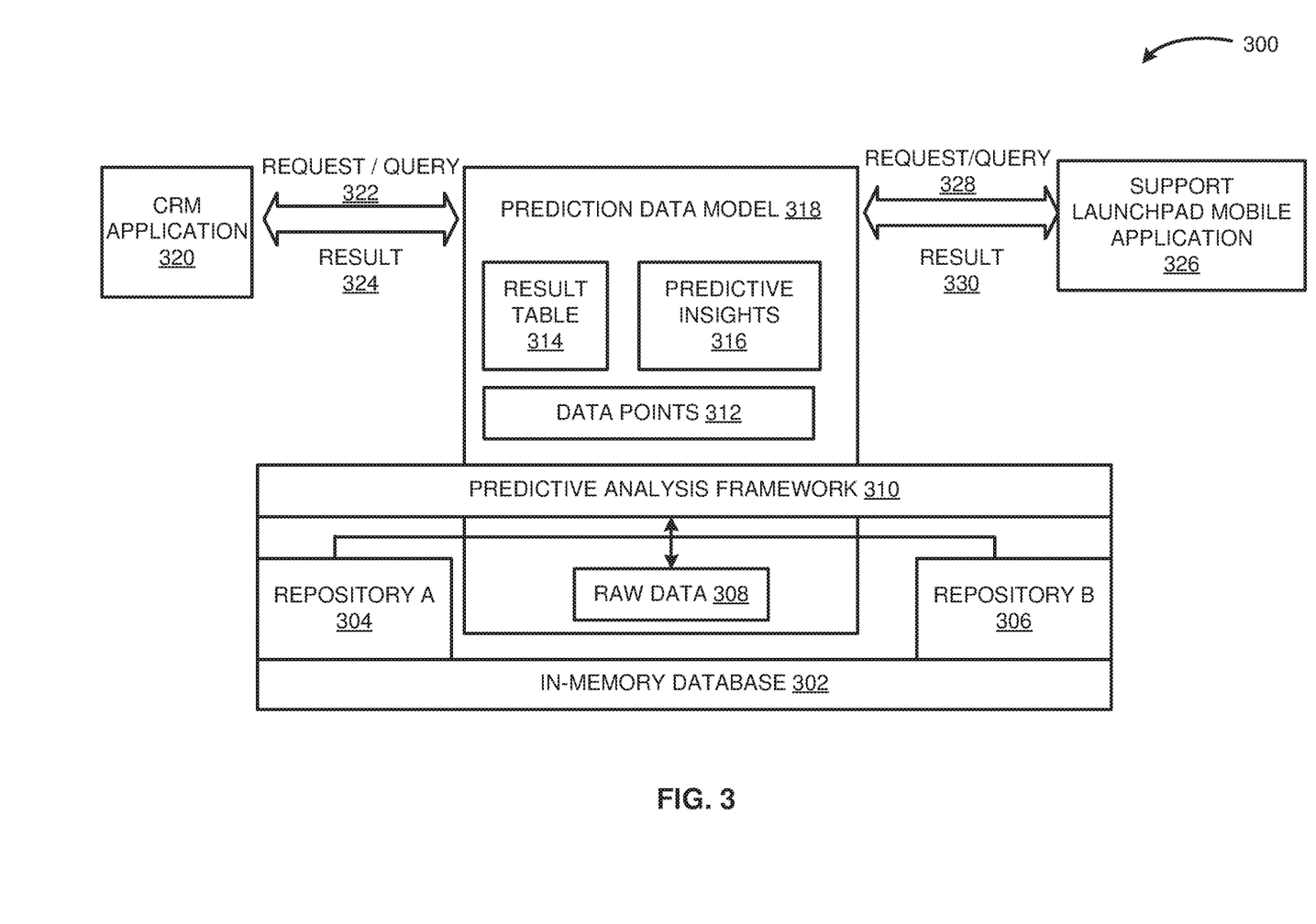
FIG. 3 is a block diagram illustrating predictive insight generation in support management using a predictive analysis framework, according to one embodiment.

FIG. 3 is block diagram 300 illustrating predictive insight generation in support management using a predictive analysis framework, according to one embodiment. In-memory database 302 repositories such as repository A 304 including customer master data and support incidents, and repository B 306 including partner and customer portal data are shown. Data from the repository A 304 and repository B 306 are retrieved as raw data 308 for analysis. In predictive analysis framework 310, data points 312 are identified and provided for analysis. For example, in support management, data points 312 such as incident notes, customer incident, name, etc., may be used. Predictive algorithm such as apriori algorithm may be used. Data points 312 and raw data 308 are provided as input to the predictive algorithm for analysis in the predictive analysis framework 310.

Based on the analysis, result table 314 is generated, and based on the result table 314 predictive insights 316 are generated. Raw data 308, data points 312, and the result table 314 are referred to as predictive data model 318. The result table 314 can be exposed as an open data protocol (ODATA) that allows other applications and services to consume the result table 314. CRM application 320 may be a web-based application. CRM application 320 may request or query 322 the predictive data model 318, and in response, predictive insights are sent as result 324 to the CRM application 320 in a format supported by web browsers. For example, if raw data 308 includes support incidents, and data points 312 include incident notes, the predictive analysis framework 310 generates potential notes and incidents as predictive insights 316, and displays in the CRM application 320. Support launchpad mobile application 326 may be a mobile-based application rendered on a mobile device. Support launchpad mobile application 326 may request or query 328 the predictive data model 318, and in response, insights are sent as result 330 to the support launchpad mobile application 326 in a format supported by the mobile device.

Figure 4A:
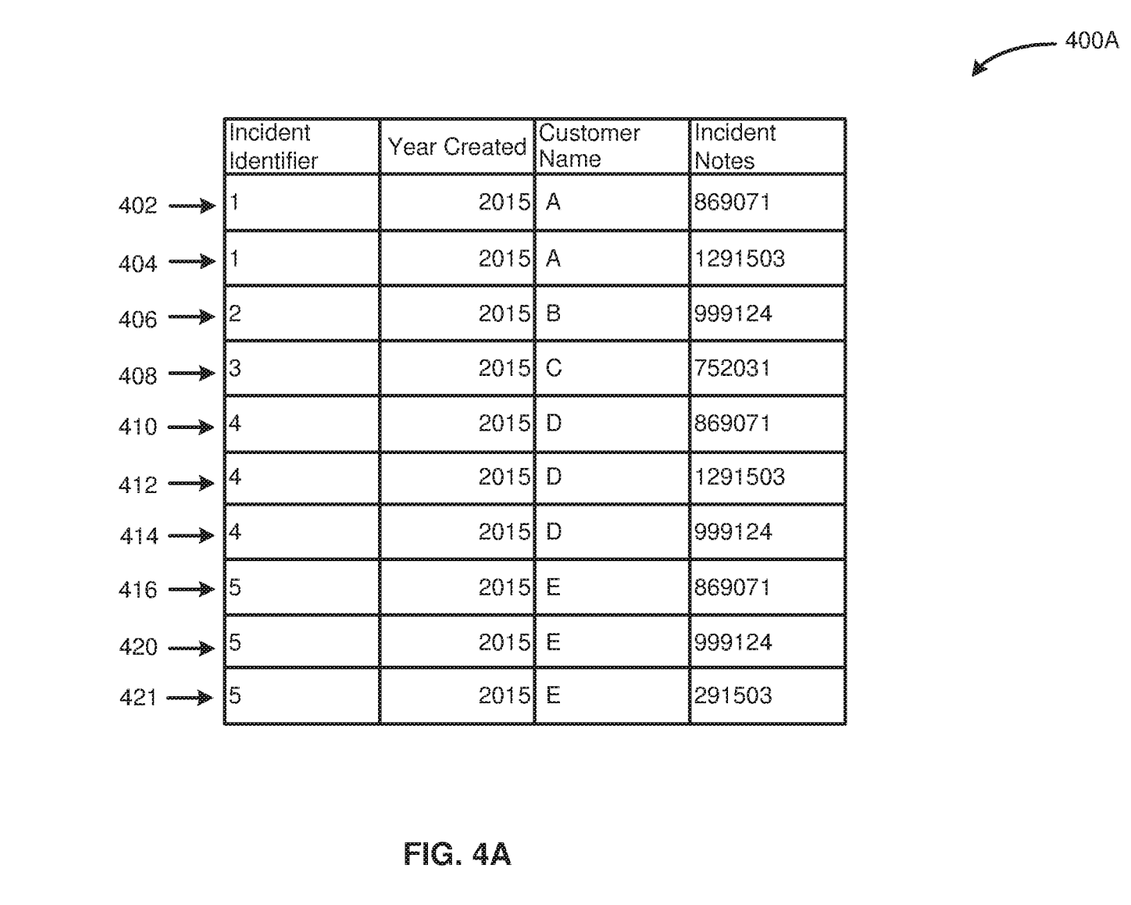
FIG. 4A illustrates an exemplary raw data table provided as input to predictive analysis framework, according to one embodiment.

FIG. 4A illustrates an exemplary raw data table 400A provided as input to predictive analysis framework, according to one embodiment. Raw data associated with support management applications may be retrieved from an in-memory database. Ten rows of raw data are shown in the raw data table 400A. Raw data has details such as incident with incident identifier, year created, customer name and incident notes with incident notes identifier. Incident notes is a data point received from a different enterprise application, or data repository. For example, row 402 has data such as incident with incident identifier '1', year created '2015', customer name 'A', and incident notes with incident notes identifier '869071'. Incident identifier '1' is associated with incident notes identifier '869071'. Similarly, other rows 404 to 421 have data corresponding to various incidents and notes associated with customers.

Figure 4B:
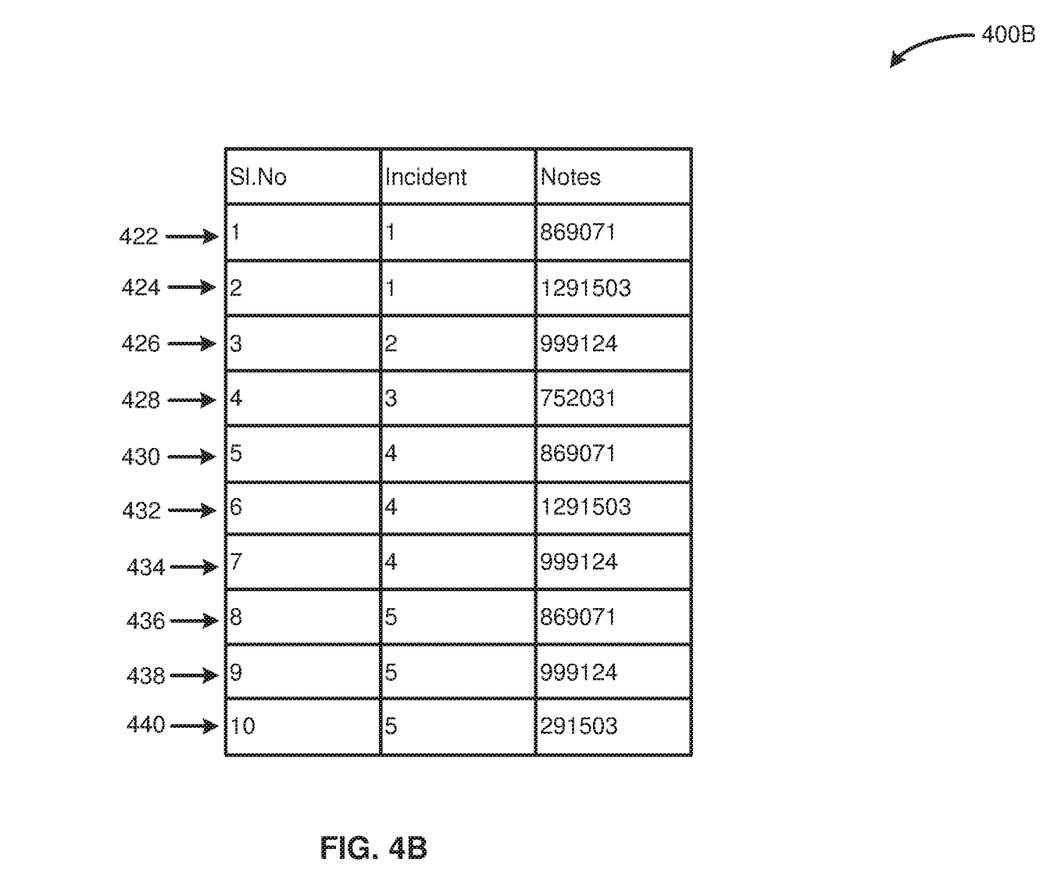
FIG. 4B illustrates an exemplary notes data point table used in the predictive analysis framework, according to one embodiment.

FIG. 4B illustrates an exemplary incident notes data point table 400B used in the predictive analysis framework, according to one embodiment. Incident notes data point table has a list of incidents with incident identifiers, and incident notes with incident notes identifiers associated with it. Ten rows of incident notes information are shown in the incident notes data point table 400B. Incident notes data point table 400B has data such as incident with incident identifier, and notes. Notes is a data point received from a different enterprise application or repository. For example, row 422 has data such as incident with incident identifier '1', and incident notes with incident notes identifier '869071' along with a serial number '1'. Incident '1' is associated with incident notes '869071'. Similarly, other rows 424 to 440 have data corresponding to various incidents and incident notes.

Figure 4C:
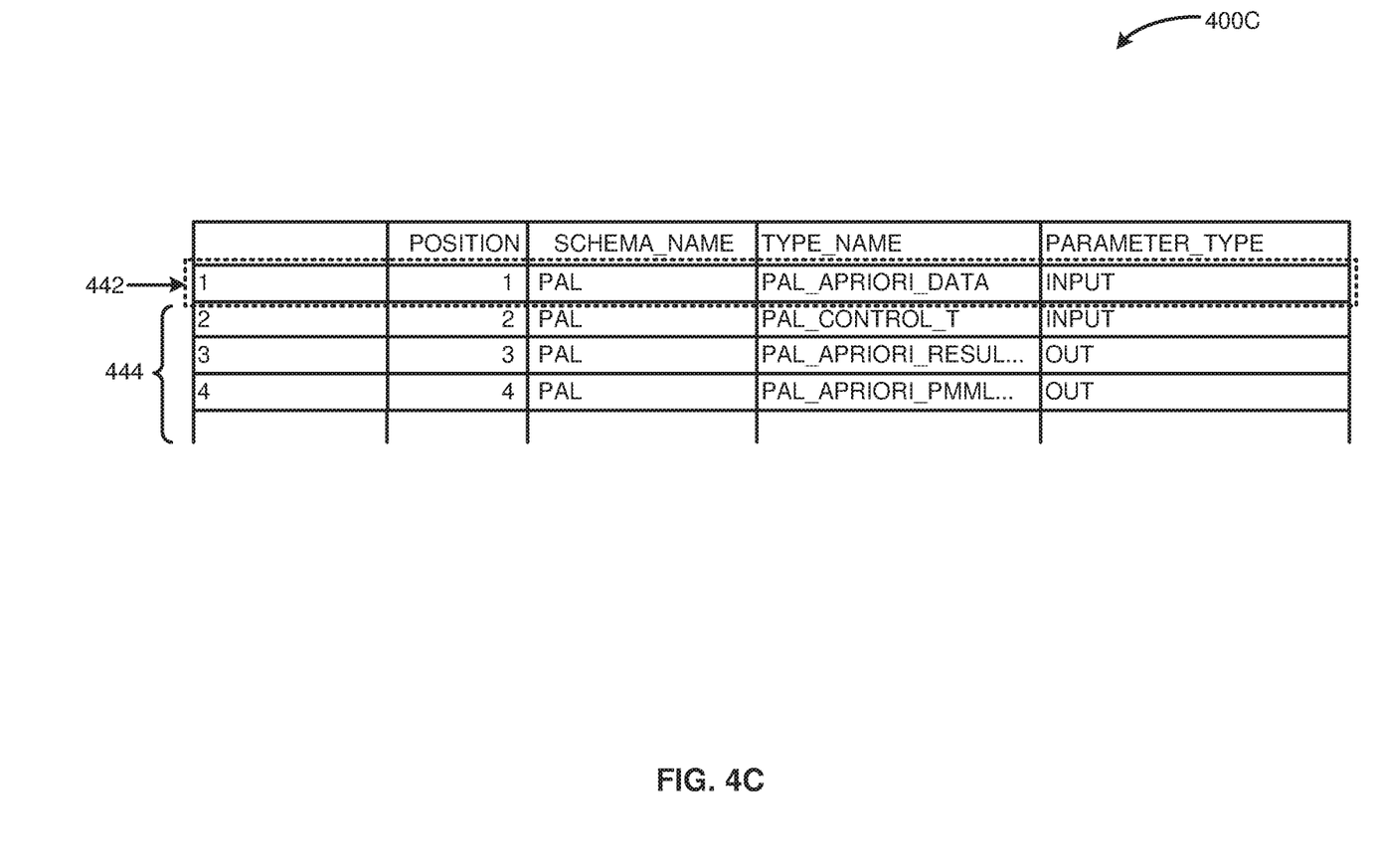
FIG. 4C illustrates an exemplary schema table provided as input to predictive analytics framework, according to one embodiment.

FIG. 4C illustrates an exemplary schema table 400C provided as input to predictive analytics framework, according to one embodiment. Schema data associated with support management applications may be retrieved from an in-memory database. Four rows of schema data are shown in the schema table 400C. Schema table 400C has data such as position, schema name, type name and parameter type. For example, row 442 has data such as position '1', schema name 'PAL', type name 'PAL_APRIORI_DATA', and parameter type 'INPUT'. Type represents properties associated with the schema. Similarly, other rows 444 have data corresponding to various schema, type name and parameter types.

Figure 4D:
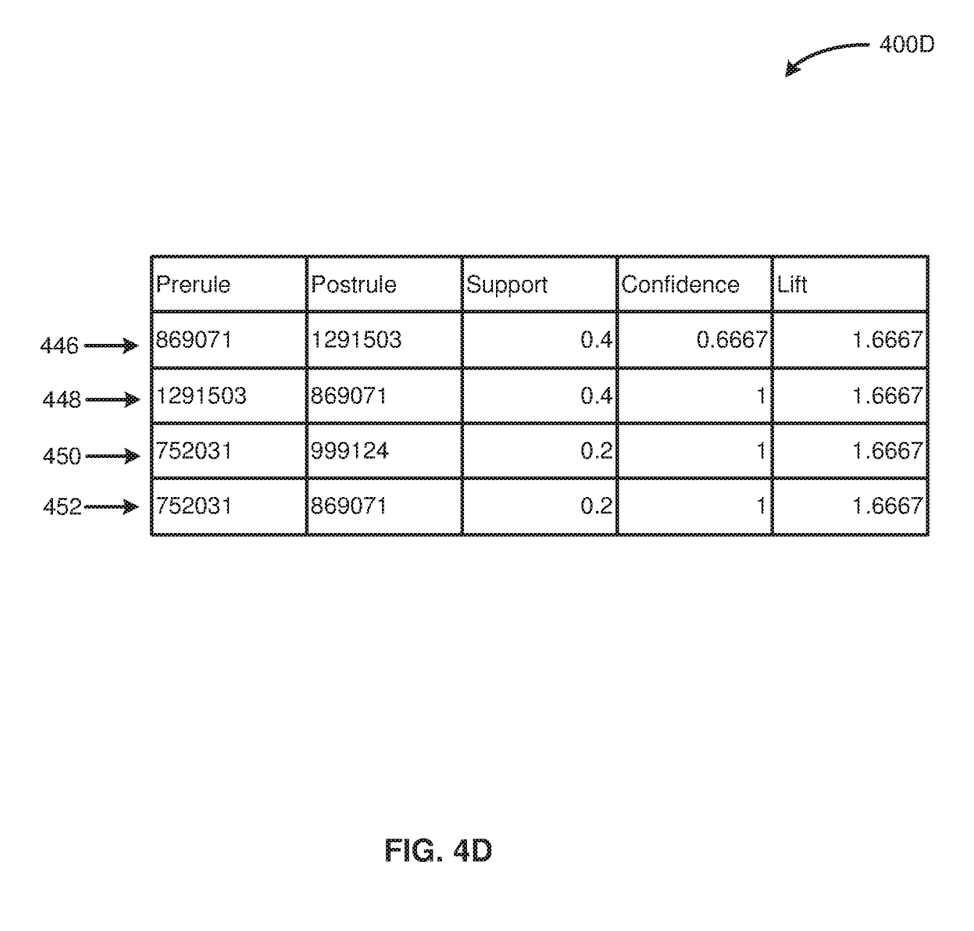
FIG. 4D illustrates an exemplary result table generated in predictive analytics framework with computed support, confidence and lift values, according to one embodiment.

FIG. 4D illustrates an exemplary result table 400D generated in predictive analytics framework with computed support, confidence and lift values, according to one embodiment. Predictive analysis is performed on the raw data table 400A, incident notes data point table 400B, and schema table 400C to discover uncovered relationships based on the frequency of occurrence of incident notes, and generate insights. The uncovered relationships can be represented in the form of rules. To generate rules, various data mining algorithms such as apriori algorithm, DSM-FI, etc., can be used. In order to find frequent notes, support and confidence of notes are determined. The strength of a rule can be measured in terms of its support and confidence. Support determines frequency of occurrence of incident notes X and Y appearing in transactions in the raw data table 400A, while confidence determines how frequently incident note X appears when incident note Y appears.

For example, consider incident notes with incident notes identifiers '869071' and '1291503', that occur in multiple transactions as shown in 422, 424, 430, 432, and 436, of FIG. 4B. Support could be calculated using a formula:

$$\text{Support}(X, Y) = \frac{\text{Count}(X \cup Y)}{N}$$

where X and Y may represent any incident notes, count $(X \cup Y)$ represents a count where both incident notes X and Y occur in transactions in the data set, and N represents the total number of transaction. Support is calculated for the incident notes identifiers '869071' and '1291503' using the above formula. Let count $(869071 \cup 1291503)$ be 2 and N be 5, Support (869071, 1291503) is calculated as 2/5=0.4 shown in row 446. Confidence is calculated using a formula:

$$\text{Confidence}(X, Y) = \frac{\text{Support}(X \cup Y)}{\text{Support}(X)}$$

where X and Y may represent any incident notes, support $(X \cup Y)$ represents a measure of occurrence of both incident notes X and Y occur in transactions, and support (X) represents a measure of occurrence of incident notes X occurs in transactions. Confidence is calculated for the incident notes identifiers '869071' and '1291503' using the above formula. Support $(869071 \cup 1291503)$ is calculated as 0.4, and support (869071) is 0.6, Confidence (869071, 1291503) is calculated as 0.4/0.6=0.6667 as shown in row 446.

Typically, a high value of support and confidence, implies a strong association. However, in some cases if X and Y have a high support, a high value for confidence is possible even when X and Y are independent of each other. Lift is a used to gauge the strength of association rule. Lift ratio is the calculated using the formula below:

$$\text{Lift}(X, Y) = \frac{\text{Support}(X \cup Y)}{\text{Support}(X) * \text{Support}(Y)}$$

Let support $(869071 \cup 1291503)$ be 0.4, support (869071) is 0.6, and support (1291503) is 0.4. Lift (869071, 1291503) is calculated as 0.4/0.6*0.4=1.6667 as shown in row 446. The lift values indicate measure of performance of rules at predicting. Similarly, support, confidence and lift values are computed for the remaining incident notes. Based on higher lift values association rules are identified. Association rule is considered strong if the lift ratio is greater than 1.0. Value 1.0 is referred to as a threshold value, and the threshold value may be pre-defined or user-defined. Pre-rule 869071 and post-rule 1291503 have a lift value of 1.6667, and that is greater than the threshold value 1.0. Accordingly, pre-rule 869071 and post-rule 1291503 form a strong association rule. Because of the strong association rule, occurrence of incident notes identifier 869071 indicates occurrence of incident notes identifier 1291503. When a note corresponding to identifier 869071 is handled, an incident note corresponding to identifier 1291503 can be proactively handled to prevent its occurrence. Similarly, support, confidence and lift values are computed (not shown) for the remaining rules as shown in rows 448 to 452.

Figure 5:
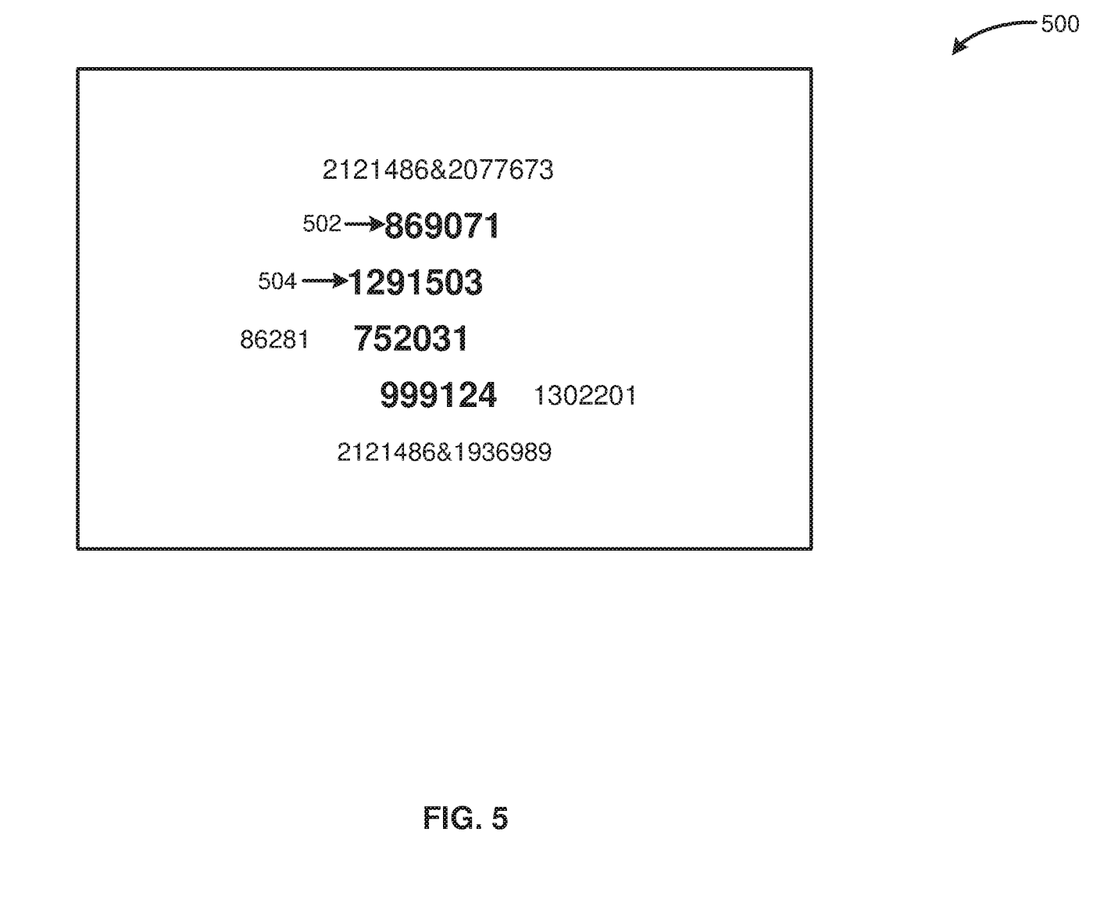
FIG. 5 illustrates an exemplary user interface-displaying predictive pattern based on result table generated in predictive analysis framework.

FIG. 5 illustrates an exemplary user interface 500 displaying predictive pattern based on result table generated in predictive analysis framework, according to one embodiment. Pre-rule, post-rule, support, confidence, and lift values are generated in result table 400D as shown in FIG. 4D. Pre-rule and post-rule with a lift value greater than 1.0 are identified as a strong association rule. Pre-rule '869071' and post-rule '1291503' with a lift value 1.6667 is greater than 1.0, and are considered as a strong association rule. The pre-rule '869071' 502 and post-rule '1291503' 504 is displayed in bigger fonts indicating a strong association rule, and they are referred to as loud patterns. Similarly, other pre-rules and post-rules are displayed in font sizes corresponding to lift values. Higher the lift values, larger the size of the fonts, and lower the lift values smaller the size of the fonts.

Figure 6:
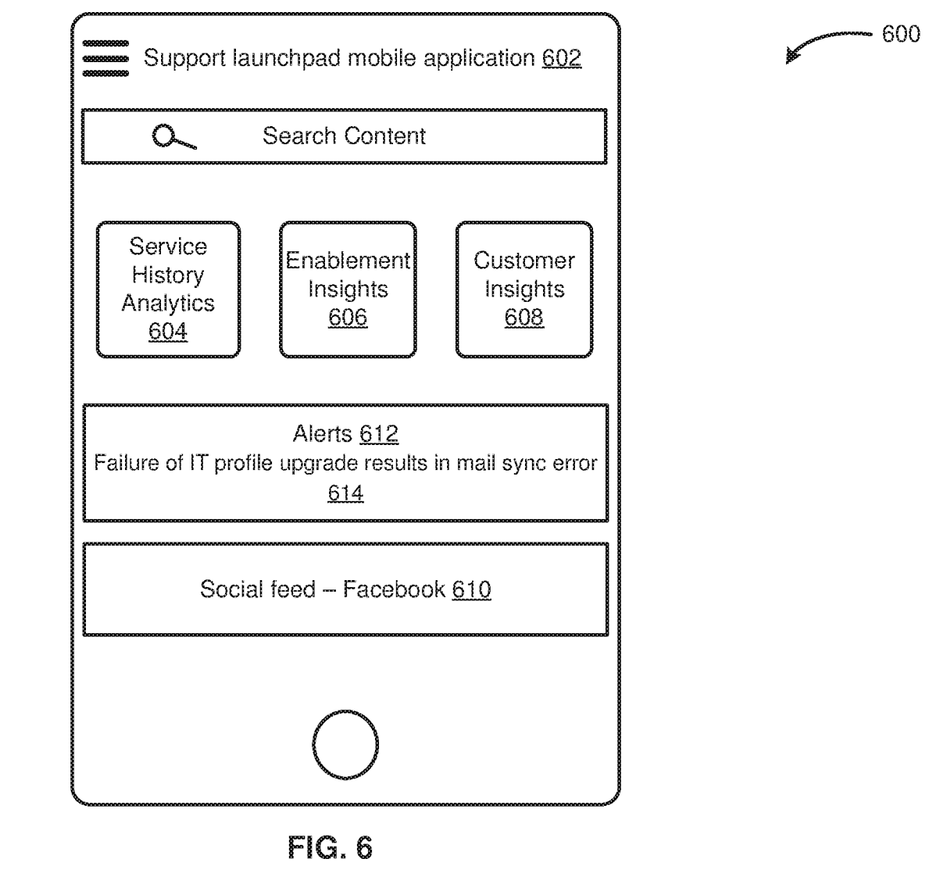
FIG. 6 illustrates an exemplary a user interface of a mobile application displaying functionalities corresponding to the generated predictive pattern, according to one embodiment.

FIG. 6 illustrates an exemplary user interface 600 of a mobile application displaying functionalities corresponding to the generated predictive pattern, according to one embodiment. In the user interface 600 of support launchpad mobile application 602, various insights generated are shown. When a user logs into the support launchpad mobile application 602, various functionalities or services such as service history analytics 604, enablement insights 606, customer insights 608, social feed 610, alerts 612, etc., are provided to the user. When user selects a service, for example, alerts 612, based on the pre-rule and post-rule associations identified in the result table 500 in FIG. 5, incident notes corresponding to strong association rule are displayed as incident notes for known scenario prevention as shown in 614.

In one embodiment, predictive analysis framework may be used in anomaly detection. For example, consider that system configuration details of customers are retrieved for anomaly detection. Based on the system configuration details and configurable data points, customer wise clusters are generated in the predictive analysis framework. K-means clustering algorithm may be used on the system configuration details to generate clusters. 'K' initial centroids are chosen, where 'K' represents the number of clusters to be found. The system configuration details of each customer from the centroid are computed and issue data are placed in a cluster that has minimum distance between the centroid and the system configuration details. This process may be repeated iteratively for a pre-defined number of times. Issue data farthest from the center of the cluster is identified as an anomaly, and can be handled proactively for that customer. The anomaly here may be an incorrect system configuration. Another example usage of this anomaly detection may be in fraud detection system. License type may be used as a data point and clusters may be generated, as a result an outlier could be identified based on conflicting value of license.

Figure 7:
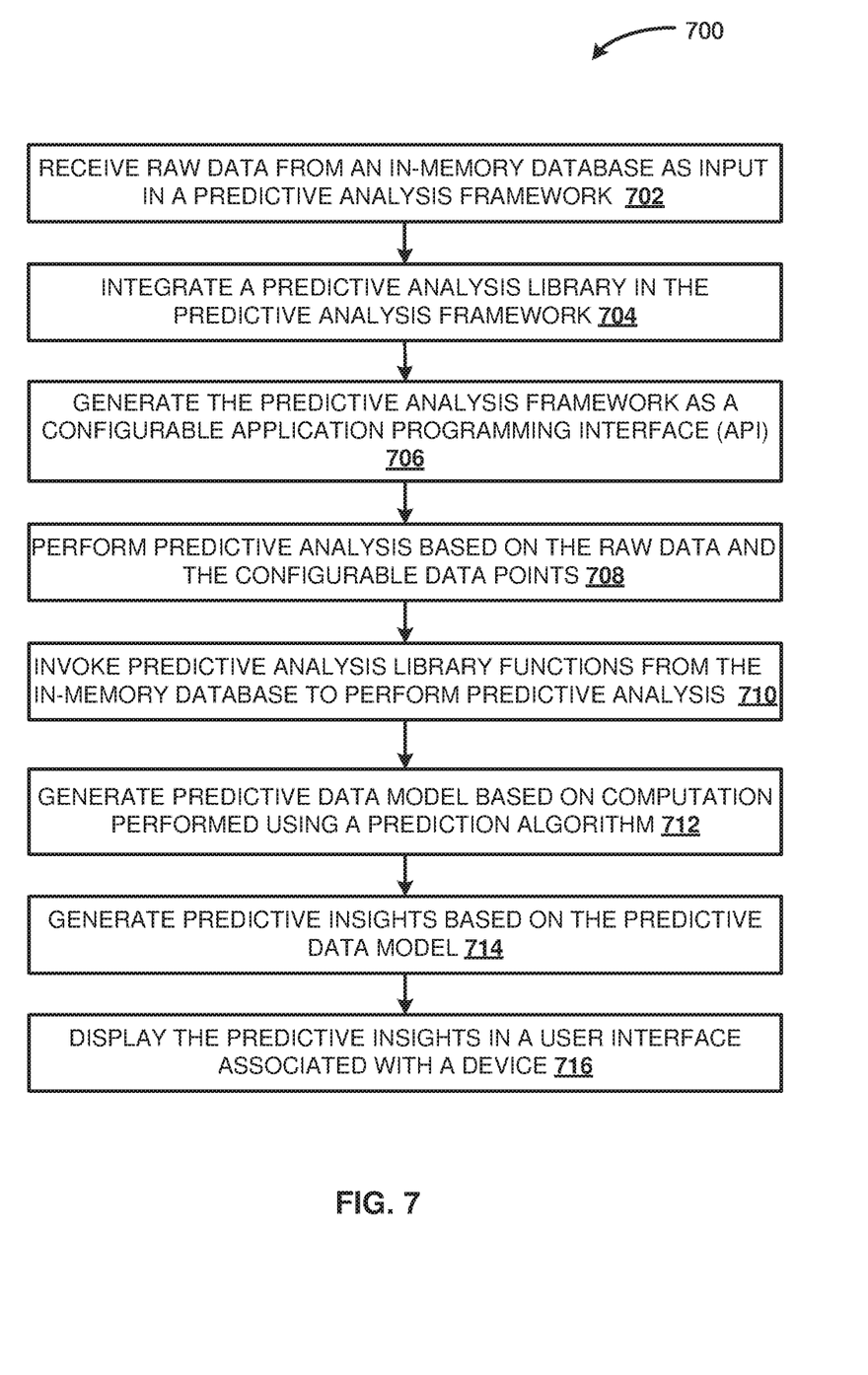
FIG. 7 is a flow chart, illustrating a process of generating insights in a predictive analysis framework for support management, according to one embodiment.

FIG. 7 is a flow chart 700, illustrating a process of generating insights in a predictive analysis framework for support management, according to one embodiment. At 702, raw data is received as input from an in-memory database in a predictive analysis framework. For example, raw data may be incident notes in raw data table 400A. At 704, a predictive analysis library (PAL) is integrated in the predictive analysis framework. For example, PAL may support various predictive analysis algorithms for operations such as clustering, classification, association, etc. At 706, the predictive analysis framework is generated as a configurable application-programming interface (API). At 708, predictive analysis for a support management application is computed based on the raw data and the configurable data points. At 710, predictive analysis library functions are invoked from the in-memory database to perform predictive analysis. At 712, predictive data model is generated based on computation performed using a prediction algorithm. At 714, predictive insights are generated in the predictive analysis framework based on the predictive data model. For example, raw data, data points and the result table may be referred to as predictive data model as explained in FIG. 3. At 716, the predictive insights are displayed in a user interface associated with a device. For example, the generated predictive insights are displayed as explained in FIG. 6.

Some embodiments may include the above-described methods being written as one or more software components. These components, and the functionality associated with each, may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits (ASICs), programmable logic devices (PLDs) and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 8:
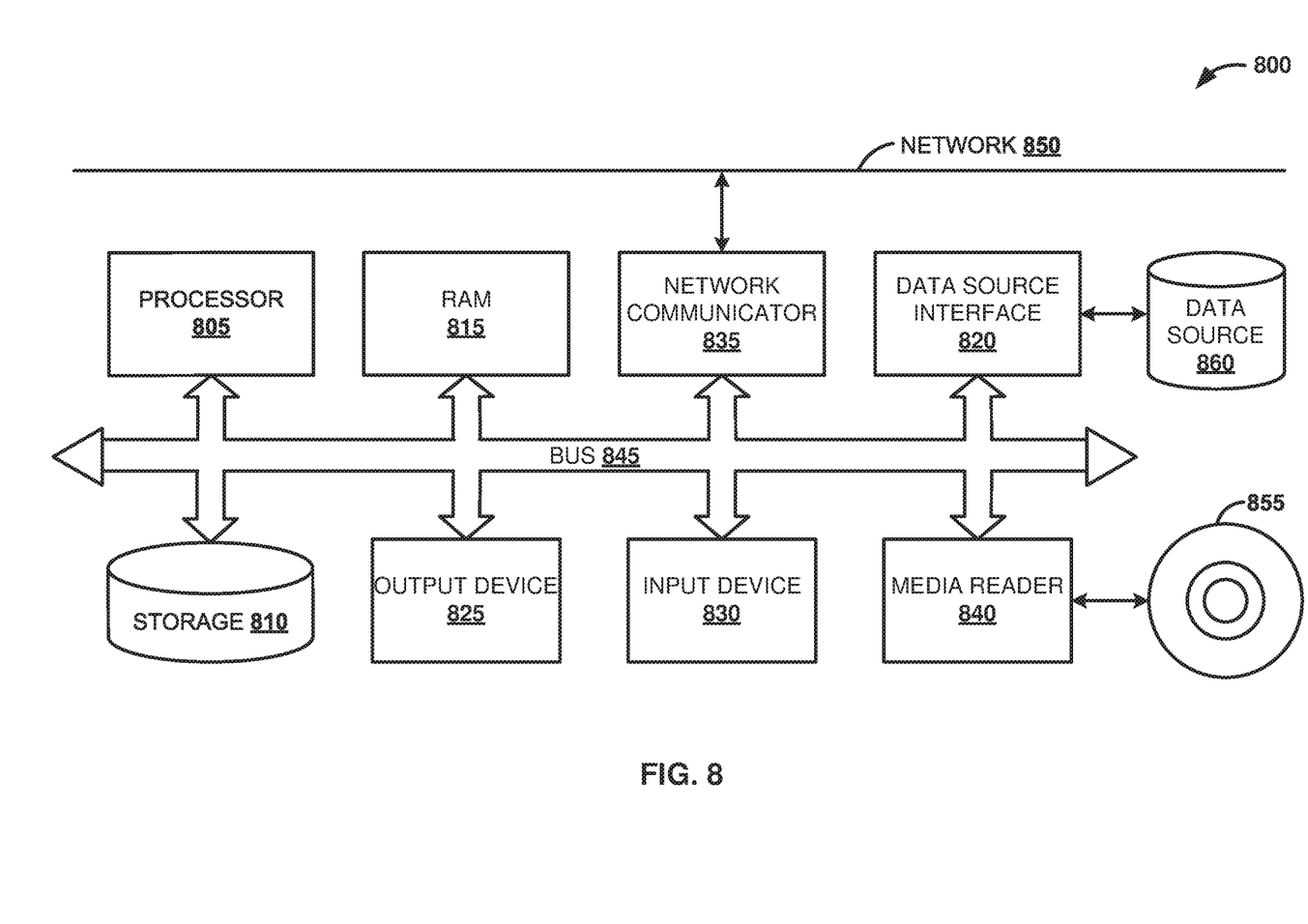
FIG. 8 is a block diagram illustrating an exemplary computer system, according to one embodiment.

FIG. 8 is a block diagram of an exemplary computer system 800. The computer system 800 includes a processor 805 that executes software instructions or code stored on a computer readable storage medium 855 to perform the above-illustrated methods. The computer system 800 includes a media reader 840 to read the instructions from the computer readable storage medium 855 and store the instructions in storage 810 or in random access memory (RAM) 815. The storage 810 provides a large space for keeping static data where at least some instructions could be stored for later execution. The stored instructions may be further compiled to generate other representations of the instructions and dynamically stored in the RAM 815. The processor 805 reads instructions from the RAM 815 and performs actions as instructed. According to one embodiment, the computer system 800 further includes an output device 825 (e.g., a display) to provide at least some of the results of the execution as output including, but not limited to, visual information to users and an input device 830 to provide a user or another device with means for entering data and/or otherwise interact with the computer system 800. Each of these output devices 825 and input devices 830 could be joined by one or more additional peripherals to further expand the capabilities of the computer system 800. A network communicator 835 may be provided to connect the computer system 800 to a network 850 and in turn to other devices connected to the network 850 including other clients, servers, data stores, and interfaces, for instance. The modules of the computer system 800 are interconnected via a bus 845. Computer system 800 includes a data source interface 820 to access data source 860. The data source 860 can be accessed via one or more abstraction layers implemented in hardware or software. For example, the data source 860 may be accessed by network 850. In some embodiments the data source 860 may be accessed via an abstraction layer, such as a semantic layer.

A data source is an information resource. Data sources include sources of data that enable data storage and retrieval. Data sources may include databases, such as relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A non-transitory computer-readable medium to store instructions, which when executed by a computer, cause the computer to perform operations comprising:
   receive raw data from an in-memory database as input in a predictive analysis framework;
   receive, from one of an application or a data repository different from the in-memory database from which the raw data is received, configurable data points as input in the predictive analysis framework, wherein the configurable data points are pre-configured prior to receipt in the predictive analysis framework and are related to, and distinct from, the received raw data;
   compute predictive analysis for a support management application based on the raw data and the configurable data points, wherein the computed predictive analysis includes computation of a support value, a confidence value and a lift value, and the predictive analysis indicates a strength of a relationship between at least two pre-configured configurable data points based on a frequency of occurrence of the at least two pre-configured configurable data points, wherein the strength of the relationship is the likelihood a second pre-configured data point of the at least two pre-configured configurable data points is present in a case that a first pre-configured data point of the at least two pre-configured configurable data points is present;
   generate a predictive data model based on computation performed using a prediction algorithm in the predictive analysis, wherein the predictive data model includes association rules, and the association rules are generated based on a determination that the computed lift value for the at least two pre-configured configurable data points is greater than a threshold value;
   generate predictive insights in the predictive analysis framework based on the predictive data model; and
   display the predictive insights at a user interface associated with a device, wherein at least one predictive insight is displayed as a note with instructions how to prevent an incident associated with one of the at least two pre-configured configurable data points.

2. The computer-readable medium of claim 1, further comprises instructions which when executed by the computer further cause the computer to:
   generate the predictive analysis framework as a configurable application programming interface (API); and
   expose the configurable API as a service.

3. The computer-readable medium of claim 1, further comprises instructions which when executed by the computer further cause the computer to:
   receive raw data associated with the support management application and pre-configured configurable data points associated with incident notes as input in the predictive analysis framework;
   compute predictive analysis for the support management application based on the raw data and the pre-configured configurable data points;
   generate potential notes and incidents as predictive insights based on the predictive analysis; and
   display the potential notes and incidents as alerts and notifications in the user interface associated with a mobile device.

4. The computer-readable medium of claim 1, further comprises instructions which when executed by the computer further cause the computer to:
   generate the predictive data model as OData service; and
   expose the OData service for consumption by an application.

5. The computer-readable medium of claim 1, further comprises instructions which when executed by the computer further cause the computer to:
   integrate a predictive analysis library in the predictive analysis framework; and
   invoke predictive analysis library functions from the in-memory database while generating the predictive data model.

6. The computer-readable medium of claim 1, further comprises instructions which when executed by the computer further cause the computer to:
   input the predictive data model to an enterprise application; and
   generate predictive insights in the predictive analysis framework based on data in the enterprise application.

7. The computer-readable medium of claim 1, wherein the pre-configured configurable data points are received from a notes framework.

8. The computer-readable medium of claim 7, wherein the pre-configured configurable data points are one of release documents, incident notes, bug fixes, frequently asked questions and feature releases.

9. A computer-implemented method of generating insights in a predictive analysis framework for support management, the method comprising:
   receiving raw data from an in-memory database as input in the predictive analysis framework;
   receiving, from one of an application or a data repository different from the in-memory database from which the raw data is received, configurable data points as input in the predictive analysis framework, wherein the configurable data points are pre-configured prior to receipt in the predictive analysis framework and are related to, and distinct from, the received raw data;
   computing predictive analysis for a support management application based on the raw data and the configurable data points, wherein the computed predictive analysis includes computation of a support value, a confidence value and a lift value, and the predictive analysis indicates a strength of a relationship between at least two pre-configured configurable data points based on a frequency of occurrence of the at least two pre-configured configurable data points, wherein the strength of the relationship is the likelihood a second pre-configured data point of the at least two pre-configured configurable data points is present in a case that a first pre-configured data point of the at least two pre-configured configurable data point is present;
   generating a predictive data model based on computation performed using a prediction algorithm in the predictive analysis, wherein the predictive data model includes association rules and the association rules are generated based on a determination that the computed lift value for the at least two pre-configured configurable data points is greater than a threshold value;
   generating predictive insights in the predictive analysis framework based on the predictive data model; and
   displaying the predictive insights at a user interface associated with a device, wherein at least one predictive insight is displayed as a note with instructions how to prevent an incident associated with one of the at least two pre-configured configurable data points.

10. The method of claim 9, further comprising:
   generating the predictive analysis framework as a configurable application programming interface (API); and
   exposing the configurable API as a service.

11. The method of claim 9, further comprising:
   receiving raw data associated with support management application and pre-configured configurable data points associated with incident notes as input in the predictive analysis framework;
   computing predictive analysis for the support management application based on the raw data and the pre-configured configurable data points;
   generating potential notes and incidents as predictive insights based on the predictive analysis; and
   displaying the potential notes and incidents as alerts and notifications in the user interface associated with a mobile device.

12. The method of claim 9, further comprising:
   generating the predictive data model as OData service; and
   exposing the OData service for consumption by an application.

13. The method of claim 9, further comprising:
   integrating a predictive analysis library in the predictive analysis framework; and
   invoking predictive analysis library functions from the in-memory database while generating the predictive data model.

14. The method of claim 9, further comprising:
   receiving the predictive data model as input in an enterprise application; and
   generating predictive insights in the predictive analysis framework based on data in the enterprise application.

15. A computer system for generating insights in a predictive analysis framework for support management, comprising:
   a computer memory to store program code; and
   a processor to execute the program code to:
   receive raw data from an in-memory database as input in the predictive analysis framework;
   receive, from one of an application or data repository different from the in-memory database from which the raw data is received, configurable data points as input in the predictive analysis framework, wherein the configurable data points are pre-configured prior to receipt in the predictive analysis framework and are related to, and distinct from, the received raw data;
   compute predictive analysis for a support management application based on the raw data and the configurable data points, wherein the computed predictive analysis includes computation of a support value, a confidence value and a lift value, and the predictive analysis indicates a strength of a relationship between at least two pre-configured configurable data points based on a frequency of occurrence of the at least two pre-configured configurable data points, wherein the strength of the relationship is the likelihood a second pre-configured data point of the at least two pre-configured configurable data points is present in a case that a first pre-configured data point of the at least two pre-configured configurable data points is present;
   generate a predictive data model based on computation performed using a prediction algorithm in the predictive analysis, wherein the predictive data model includes association rules and the association rules are generated based on a determination that the computed lift value for the at least two pre-configured configurable data points is greater than a threshold value;
   generate predictive insights in the predictive analysis framework based on the predictive data model; and
   display the predictive insights at a user interface associated with a device, wherein at least one predictive insight is displayed as a note with instructions how to prevent an incident associated with one of the at least two pre-configured configurable data points.

16. The system of claim 15, wherein the processor further executes the program code to:
   generate the predictive analysis framework as a configurable application programming interface (API); and
   expose the configurable API as a service.

17. The system of claim 15, wherein the processor further executes the program code to:
   receive raw data associated with support management application and pre-configured configurable data points associated with incident notes as input in the predictive analysis framework;

compute predictive analysis for the support management application based on the raw data and the pre-configured configurable data points;
generate potential notes and incidents as predictive insights based on the predictive analysis; and
display the potential notes and incidents as alerts and notifications in the user interface associated with a mobile device.

18. The system of claim 15, wherein the processor further executes the program code to:
generate the predictive data model as OData service; and
expose the OData service for consumption by an application.

19. The system of claim 15, wherein the processor further executes the program code to:
integrate a predictive analysis library in the predictive analysis framework; and
invoke predictive analysis library functions from the in-memory database while generating the predictive data model.

* * * * *